United States Patent
Yang et al.

(10) Patent No.: US 12,249,890 B2
(45) Date of Patent: Mar. 11, 2025

(54) MOTOR DUST COVER DESIGN AND INTERFACE WITH COUPLING

(71) Applicant: STEERING SOLUTIONS IP HOLDING CORPORATION, Saginaw, MI (US)

(72) Inventors: Kun Yang, Jiangsu (CN); Read Wei, Jiangsu (CN); Leon Wanyan, Jiangsu (CN); Amanda He, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 306 days.

(21) Appl. No.: 17/745,084

(22) Filed: May 16, 2022

(65) Prior Publication Data

US 2023/0291267 A1   Sep. 14, 2023

(30) Foreign Application Priority Data

Mar. 11, 2022   (CN) .......................... 202210237321.8

(51) Int. Cl.
*H02K 5/10*       (2006.01)
*H02K 5/173*      (2006.01)
(Continued)

(52) U.S. Cl.
CPC .............. *H02K 5/10* (2013.01); *H02K 5/1735* (2013.01); *H02K 7/085* (2013.01); *B62D 5/04* (2013.01)

(58) Field of Classification Search
CPC ......... B62D 5/04; B62D 5/0403; F16C 19/26; F16C 2380/27; F16C 33/723;
(Continued)

(56) References Cited

U.S. PATENT DOCUMENTS

| 4,398,774 A | * | 8/1983 | Voll | ........................ F16C 27/04 |
| | | | | 384/493 |
| 2012/0326538 A1 | * | 12/2012 | Yoshida | .................... H02K 5/08 |
| | | | | 310/43 |

(Continued)

FOREIGN PATENT DOCUMENTS

| JP | 2004225906 A | * | 8/2004 | ......... F16D 65/0978 |
| JP | 2007318972 A | * | 12/2007 | ........... B62D 5/0403 |

OTHER PUBLICATIONS

JP-2004225906-A, Heinlein, all pages (Year: 2004).*
JP-2007318972-A, Kanda, all pages (Year: 2007).*

*Primary Examiner* — Christopher M Koehler
*Assistant Examiner* — Naishadh N Desai
(74) *Attorney, Agent, or Firm* — Dickinson Wright PLLC

(57) ABSTRACT

A motor vehicle electric motor assembly includes a motor housing having an annular wall extending from a housing first end to an opposite housing second end about a central axis to bound a cavity. The housing first end has a base configured to support a bearing housing. A motor shaft extends along the central axis between a shaft first end and a shaft second end. A rotor is fixed to the shaft for rotation about the central axis. A stator is supported by the annular wall in radially spaced relation from the rotor. A bearing is fixed in the bearing housing to support the shaft first end for rotation about the central axis. An end cover assembly is fixed to the housing second end. The end cover assembly has a motor shaft opening with a periphery of the motor shaft opening supporting the shaft second end for rotation about the central axis.

17 Claims, 6 Drawing Sheets

(51) Int. Cl.
*H02K 7/08* (2006.01)
*B62D 5/04* (2006.01)

(58) Field of Classification Search
CPC .... F16J 15/3204; H02K 2213/03; H02K 5/10; H02K 5/15; H02K 5/1732; H02K 5/1735; H02K 7/085
See application file for complete search history.

(56) References Cited

U.S. PATENT DOCUMENTS

2014/0117799 A1* 5/2014 Lu .................. H02K 1/2791
310/90
2016/0241107 A1* 8/2016 King .................. H02K 7/083

* cited by examiner

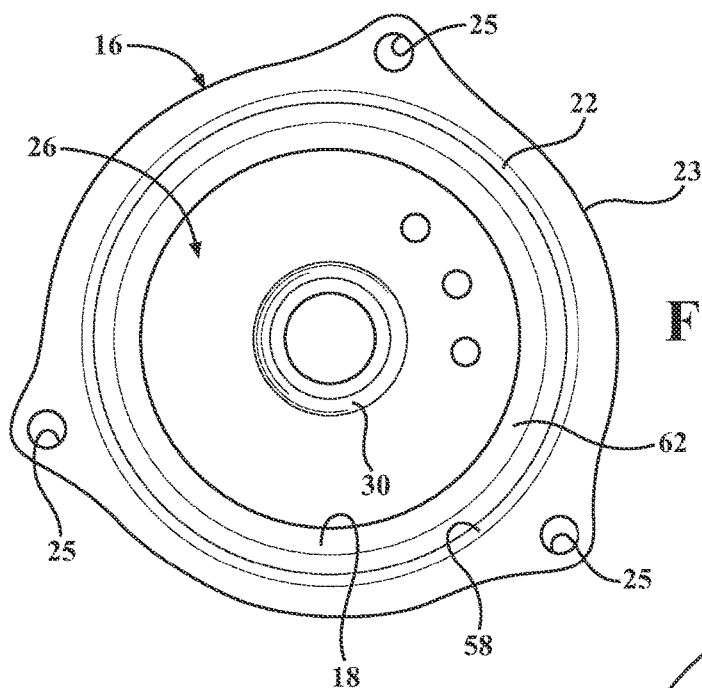
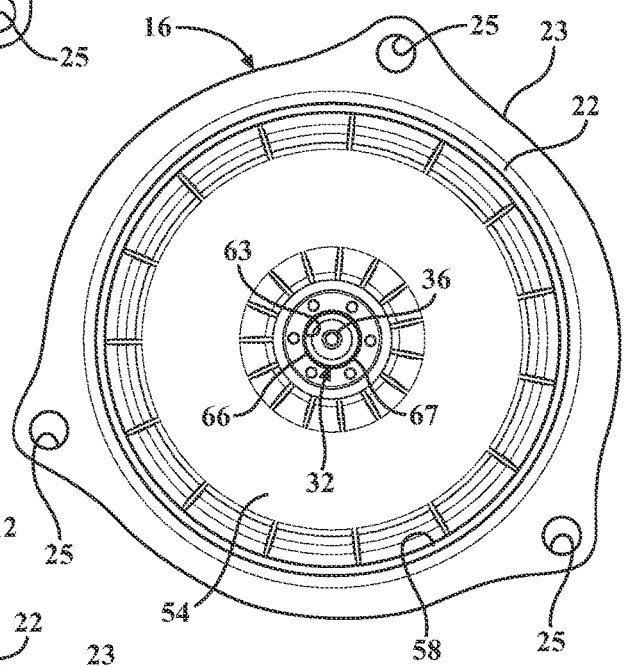
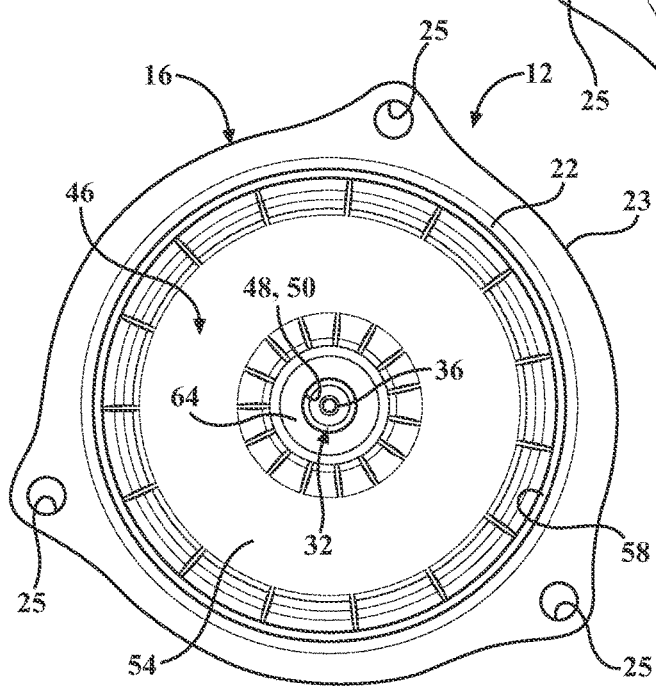
FIG. 5A
FIG. 5B
FIG. 5C

MOTOR DUST COVER DESIGN AND INTERFACE WITH COUPLING

CROSS-REFERENCE TO RELATED APPLICATION

The present application claims priority to the Chinese Patent Application No. 2022102373218 filed on Mar. 11, 2022, which is incorporated herein by reference in its entirety.

FIELD OF THE INVENTION

The present disclosure generally relates to motor assemblies for motor vehicles, and more specifically, to electric motor assemblies having a rotor supported by a shaft for rotation within a bore of a stator.

BACKGROUND OF THE INVENTION

Automotive vehicle are known to include electric motor assemblies for a variety of applications, such as steering applications and a variety of under hood applications. Regardless of the application, the electric motors typically have a rotor supported by a motor shaft for rotation within a bore of a stator. The motor shaft is typically supported within a metal motor housing in known beam style fashion by a pair of bearings, with one bearing located at each end of the motor shaft. The bearings each require tight tolerance fits of the motor shaft through a bore of a bearing inner race, and also require each end of the metal, typically steel, motor housing to have bearing receptacles, also referred to as bearing housings, having tightly controlled tolerances for precision receipt of a bearing outer race. One bearing housing is typically provided at a permanently closed end of the metal motor housing, while the other bearing is typically supported by a metal end cover of the motor housing, wherein the metal end cover closes off an open end of a generally cup-shaped portion of the metal housing. It is important that the pair of bearings are maintained in coaxial alignment with one another along a central axis passing through a bore of the inner races to minimize the amount of friction generated within the bearings. An output shaft is typically coupled to an end of the motor shaft adjacent the metal end cover with a rigid coupling. With the motor shaft being constrained by the pair of bearings, and the coupling between the motor shaft and the output shaft being rigid, further tight, precision tolerances are required to avoid misalignment between the motor shaft and the output shaft to avoid increased friction and noise. In addition to the tight tolerances, increased weight results with the inclusion of a pair of bearings, and further, with the inclusion of the metal end cover. Further yet, by having to accommodate the pair of bearings, the motor housing must be enlarged, due in part to the axial space occupied by the bearings, with the axial length of the housing having to be increased, thus, further increasing weight and decreasing the available space remaining for other vehicle components.

What is needed is an electric motor assembly that addresses at least the issues discussed above, while providing a long and useful life, while having a reduced size and weight, that is economical in assembly, that reduces the cost associated with having to maintain precision tolerance stack-ups, and that enhances the design options by occupying a minimum of space and that optimizes performance of the motor vehicle, while reducing the overall cost thereof.

SUMMARY OF THE INVENTION

It is an object of the present disclosure to provide an electric motor assembly for automotive vehicle applications that overcomes at least some of the drawbacks discussed above with known electric motor assemblies.

It is a further object of the present disclosure to provide an electric motor assembly for automotive vehicle applications that is robust and durable in use, while being reduced in size, as well as being economical in manufacture and assembly.

It is a further object of the present disclosure to provide an electric motor assembly having loosened tolerances between a motor shaft of the electric motor assembly and a bearing supporting the motor shaft, while maintaining optimal performance of the electric motor assembly over a long and useful life.

It is a further object of the present disclosure to provide an electric motor assembly having loosened tolerances between the motor shaft and an output shaft, while maintaining optimal performance of the electric motor assembly over a long and useful life.

It is a further object of the present disclosure to provide an electric motor assembly that is quiet in operation over the entirety of its useful life.

According to the objects and advantages, an aspect of the present disclosure provides a motor vehicle electric motor assembly. The motor vehicle electric motor assembly includes a motor housing having an annular wall extending from a housing first end to an opposite housing second end about a central axis to circumferentially bound a cavity. The housing first end has a base configured to support a bearing housing and the second end is open. A motor shaft extends along the central axis between a shaft first end and a shaft second end. A rotor is fixed to the shaft for rotation about the central axis. A stator is supported by the annular wall in radially spaced relation from the rotor to define an annular motor gap between the stator and the rotor. A bearing is fixed in the bearing housing to support the shaft first end for rotation about the central axis. An end cover assembly is fixed to the housing second end, wherein the end cover assembly has a motor shaft opening extending about the central axis with an outer periphery of the motor shaft opening supporting the shaft second end for rotation about the central axis.

In accordance with another aspect of the disclosure, the bearing is a roller bearing, and wherein the shaft second end is not supported by a roller bearing.

In accordance with another aspect of the disclosure, the cover assembly includes an end cover having an end cover outer periphery fixed to the annular wall adjacent the housing second end.

In accordance with another aspect of the disclosure, the end cover outer periphery is press fit into an interference fit against an inner surface of the annular wall of the motor housing.

In accordance with another aspect of the disclosure, the housing second end has a recessed annular shoulder, wherein the end cover is pressed into engagement with the annular shoulder.

In accordance with another aspect of the disclosure, the end cover is plastic.

In accordance with another aspect of the disclosure, the end cover outer periphery has a plurality of protrusions extending radially outwardly into the interference fit.

In accordance with another aspect of the disclosure, the end cover assembly includes a shaft seal annulus fixed to the end cover. The shaft seal annulus has the motor shaft opening, wherein the motor shaft opening is sized providing an interference fit with an outer running surface of the motor shaft. The end cover has a first modulus of elasticity and the shaft seal annulus has a second modulus of elasticity, wherein the second modulus of elasticity is less than the first modulus of elasticity.

In accordance with another aspect of the disclosure, the shaft seal annulus is rubber.

In accordance with another aspect of the disclosure, the end cover is plastic.

In accordance with another aspect of the disclosure, the end cover has an end cover opening arranged in concentric relation with the motor shaft opening, wherein the end cover opening has a first diameter and the motor shaft opening has a second diameter, wherein the first diameter is greater than the second diameter.

In accordance with another aspect of the disclosure, the annular motor gap extends radially from an outer surface of the rotor to an inner surface of said stator over a minimum first radial distance, and wherein an annular shaft clearance gap extends radially from the outer running surface of the motor shaft to an inner surface of the end cover opening over a maximum second radial distance, wherein said maximum second radial distance is less than the minimum first radial distance.

In accordance with another aspect of the disclosure, the motor vehicle electric motor assembly is a steering system.

In accordance with another aspect of the disclosure, a motor vehicle electric motor assembly includes, a motor housing having an annular wall extending from a housing first end to an opposite housing second end about a central axis to circumferentially bound a cavity. The housing first end has a base configured to support a bearing housing and the second end is open. A motor shaft extends through the cavity along the central axis between a shaft first end and a shaft second end. A rotor is fixed to the shaft for rotation about the central axis within the cavity. A stator is supported by the annular wall in the cavity in radially spaced relation from the rotor to define an annular motor gap between the stator and the rotor. A bearing is fixed in the bearing housing to support the first end for rotation about the central axis. An end cover assembly is fixed to the housing second end. The end cover assembly has a motor shaft opening extending about the central axis with an outer periphery of the motor shaft opening supporting the shaft second end for rotation about the central axis in an interference fit without a roller bearing.

In accordance with another aspect of the disclosure, a method of assembling a motor vehicle electric motor assembly is provided. The method includes, providing a motor housing having an annular wall bounding a cavity extending about a central axis from a housing first end having a base to an opposite housing second end. Further, fixing a bearing to the base for rotation about the central axis and disposing a stator in the cavity. Further, disposing a motor shaft having a rotor fixed thereto within the cavity and disposing a shaft first end of the motor shaft through a bore of the bearing, with a shaft second end of the motor shaft extending beyond the housing second end and with the stator being in radially spaced relation from the rotor to define an annular motor gap between the stator and the rotor. Further yet, fixing an end cover assembly to the housing second end and supporting the shaft second end for rotation about the central axis within a motor shaft opening of the end cover assembly with an outer periphery of the motor shaft opening having an interference fit with an outer running surface of the motor shaft.

In accordance with another aspect of the disclosure, the method can further include providing the end cover assembly having an end cover, and fixing an end cover outer periphery of the end cover to the annular wall adjacent the housing second end, and having a shaft seal annulus fixed to the end cover, wherein the shaft seal annulus has the motor shaft opening, wherein the end cover has a first modulus of elasticity and the shaft seal annulus has a second modulus of elasticity, wherein the second modulus of elasticity being less than the first modulus of elasticity.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5A is an end view of the motor housing of the electric motor assembly of FIG. 2;

FIG. 5B is a view similar to FIG. 5A showing the end cover, with the seal member removed therefrom, assembled to the motor housing;

FIG. 5C is a view similar to FIG. 5B showing the seal member fixed to the end cover;

DETAILED DESCRIPTION

Figure 1:
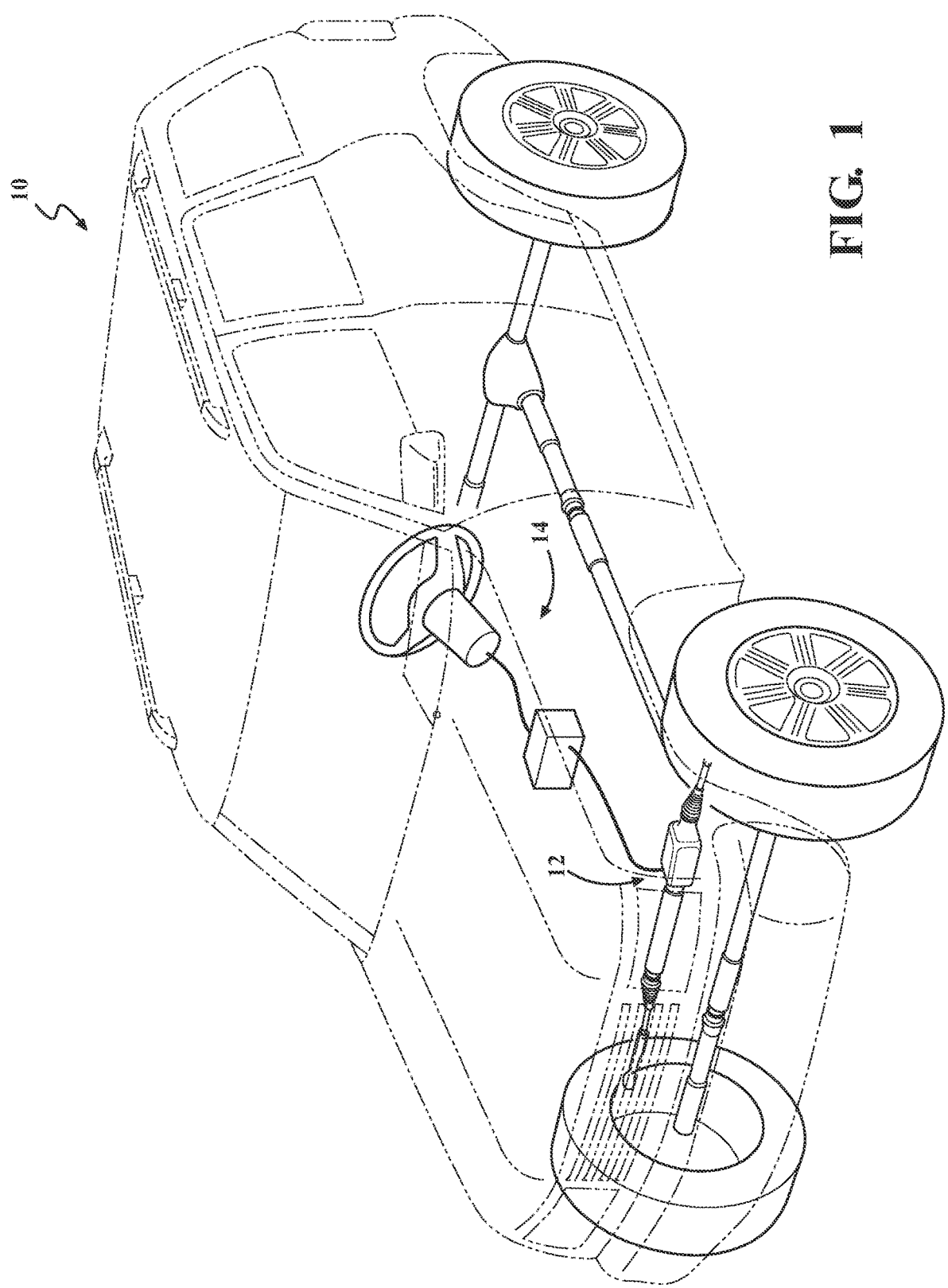
FIG. 1 is a perspective view of a motor vehicle having one or more electric motor assemblies constructed in accordance with one aspect of the disclosure.
Figure 2:
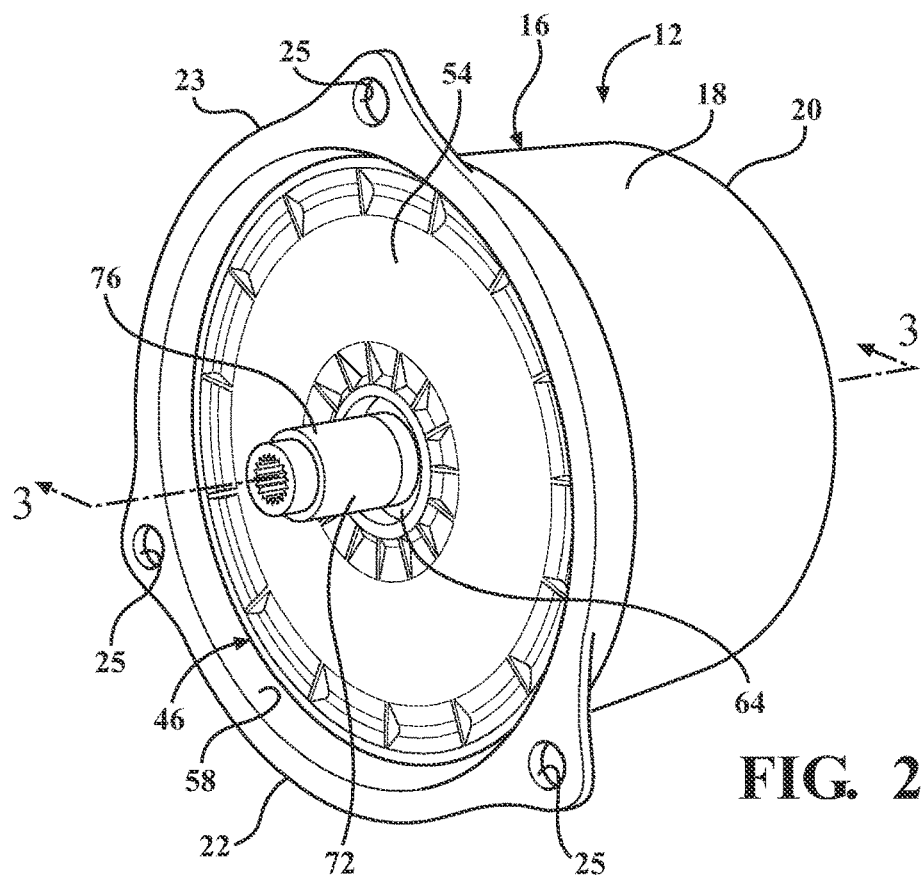
FIG. 2 is a front perspective view of an electric motor assembly of the motor vehicle of FIG. 1 constructed in accordance with one aspect of the disclosure having an output shaft coupling coupled to a motor shaft supported in a motor housing of the electric motor assembly.
Figure 2A:
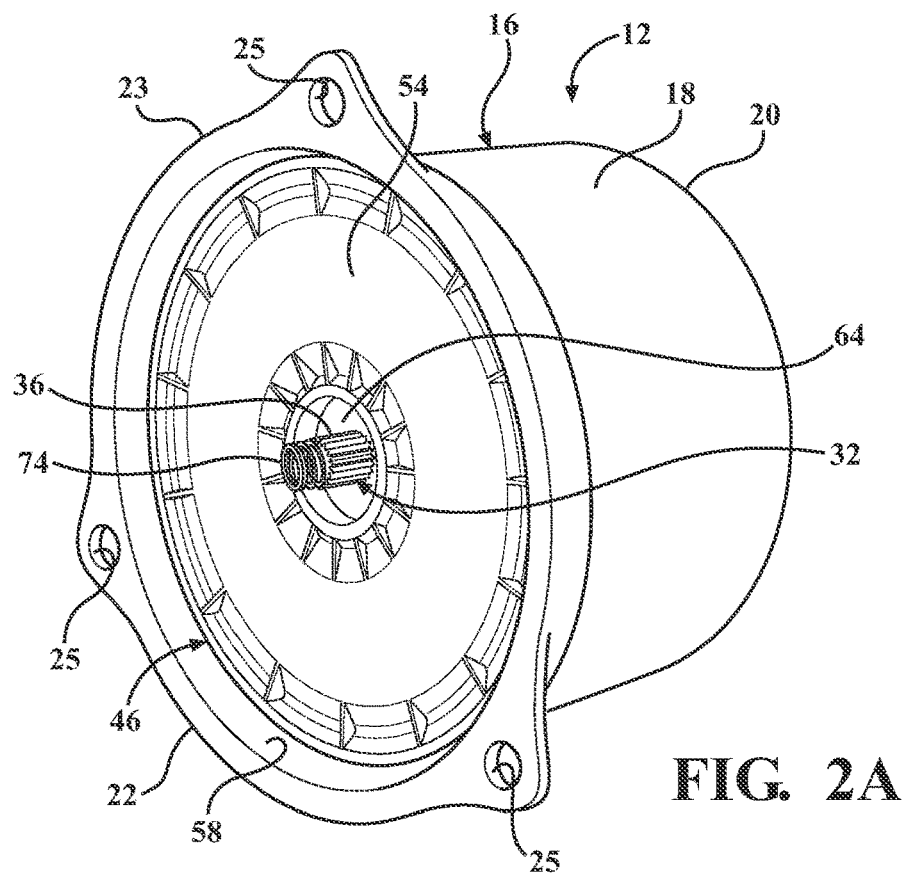
FIG. 2A is a view similar to FIG. 2 with a coupling housing of the output shaft coupling removed to illustrate a biasing member of the output shaft coupling in operable communication with the motor shaft of the electric motor assembly.
Figure 3:
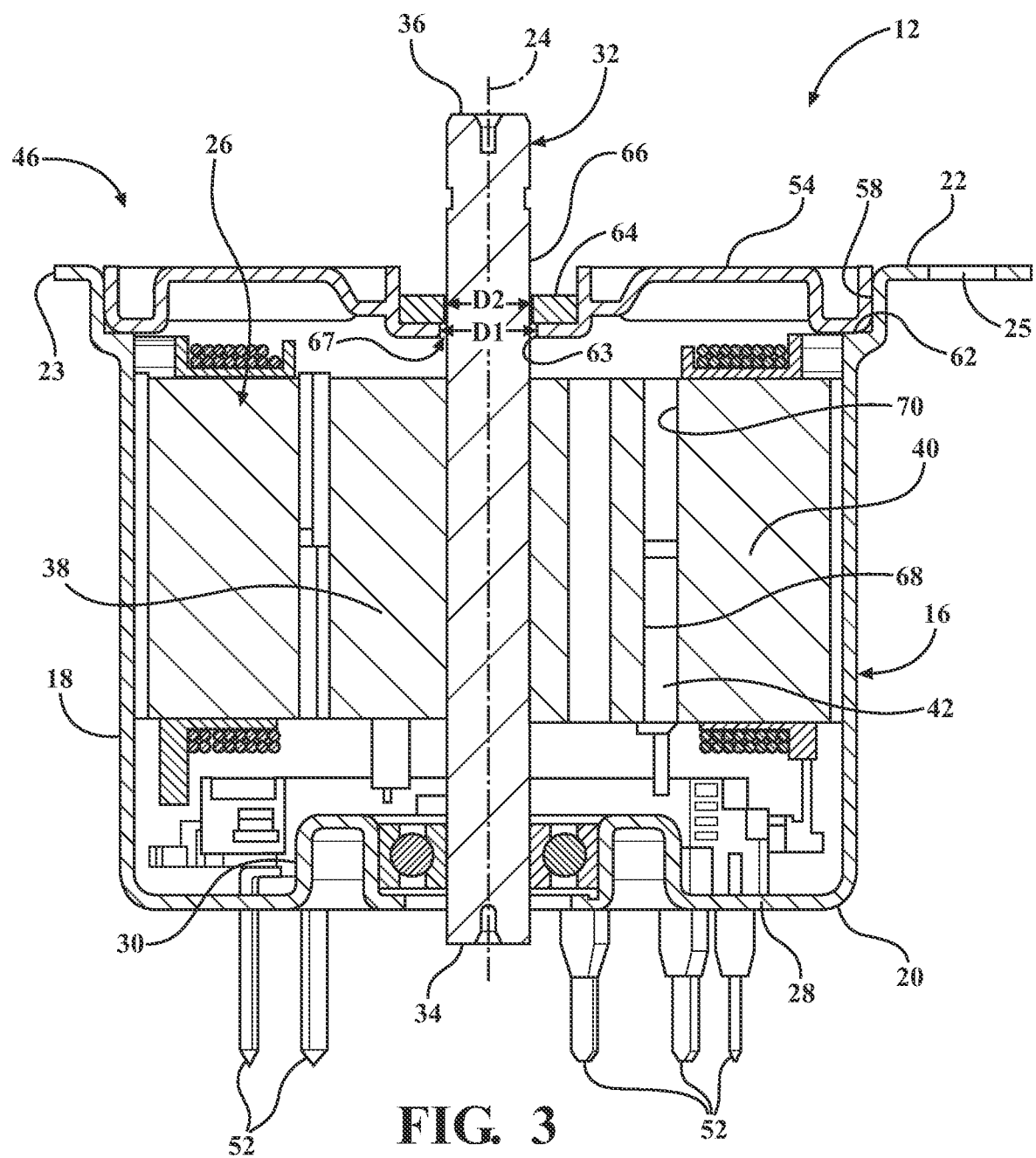
FIG. 3 is a cross-sectional view taken generally along line 3-3 of FIG. 2.
Figure 4A:
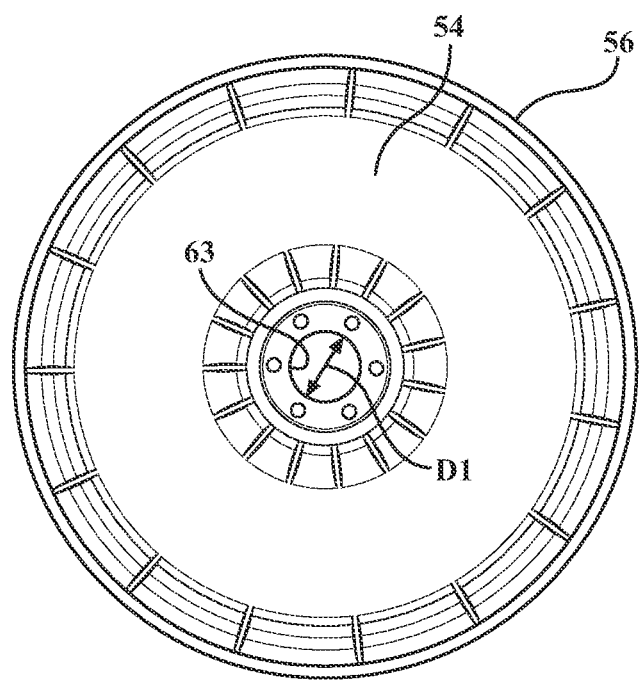
FIG. 4A is a front view of an end cover of the electric motor assembly of FIG. 2 with a seal member removed therefrom.
Figure 4B:
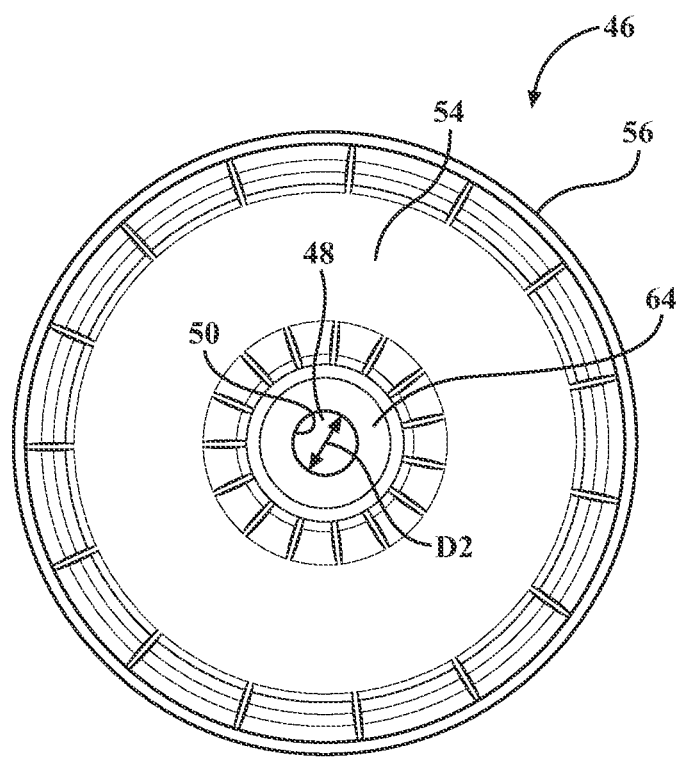
FIG. 4B is a view similar to FIG. 4A with the seal member fixed to the end cover.

Referring now to the Figures, where the invention will be described in greater detail with reference to specific embodiments, without limitation, FIG. 1 illustrates a motor vehicle 10 having one or more electric motor assemblies 12, such as may be incorporated into a steering system 14, by way of example and without limitation. As best shown in FIGS. 2, 2A and 3, the motor vehicle electric motor assembly 12 includes a motor housing 16 having an annular wall 18, shown as being generally cylindrical along its length, by way of example and without limitation, extending from a housing first end 20 to an opposite housing second end 22 about a central axis 24 (FIG. 3) to circumferentially bound a cavity 26 (FIGS. 3 and 5A). The housing second end 22 has a radially outwardly extending flange 23 to facilitate fixing the electric motor assembly 12 to the desired vehicle component, wherein the flange 23 is shown as having a plurality of fastener openings 25 configured for receipt of the desired type of fastener therethrough. The housing first end 20 has a base 28 configured to support a bearing receptacle, also referred to as bearing housing 30 (FIGS. 3 and 5A), and the housing second end 22 is open. A motor shaft 32 extends through the cavity 26 along the central axis 24 between a shaft first end 34 and a shaft second end 36. As shown in FIG. 3, a rotor 38 is fixed to the motor shaft 32 for rotation about the central axis 24 within the cavity 26. A stator 40 is supported by the annular wall 18 in the cavity 26 in radially spaced relation from the rotor 40, as is known with stators and rotors of electric motors, to define an annular motor gap 42 (FIG. 3) between the stator 40 and the rotor 38, wherein the gap 42 is provided to assure the rotor 38 does not contact the stator 40. A roller bearing 44, such as a roller ball bearing, by way of example and without limitation, wherein roller bearing 44 herein is intended to mean that rolling elements (balls, needles, rollers) are provided between an inner race and an outer race of the roller bearing 44, is fixed in the bearing housing 30 to support the shaft first end 34 for rotation about the central axis 24. An end cover assembly 46 is fixed to the housing second end 22 to close off the housing second end 22 and to seal off the cavity 26 against the ingress of solid and fluid contamination. The end cover assembly 46 has a motor shaft opening 48 (FIG. 4B) extending about the central axis 24 with an outer periphery 50 of the motor shaft opening 48 supporting the shaft second end 36 for rotation about the central axis 24 in an interference fit. The outer periphery 50 is thus provide to act as a support and running surface for the motor shaft 32 without need of a roller bearing. Accordingly, the motor shaft 32 is supported in beam fashion by the single roller bearing 44 at one end 34, and with the opposite end 36 being supported without a roller bearing via end cover assembly 46. As such, by only requiring a single roller bearing at one end of the motor shaft 32, the motor housing 16 can be made having a reduced, minimal axially extending length, and the time and complexity for manufacture and assembly can be reduced, while the operating performance of the electric motor assembly 12 can be enhanced by reducing the potential radial loads imparted on motor shaft 32 that could otherwise occur with misaligned pairs of roller bearings, as will be understood by a person possessing ordinary skill in the art upon viewing the disclosure herein. Accordingly, with reduced radial loads being imparted on the motor shaft 32, the potential for parasitic power losses and noise is greatly reduced.

The base 28 of the motor housing 16 can be formed as a monolithic piece of material with the annular wall 18, or it could be formed from a separate piece of material and fixed to the annular wall 18, such as via a weld joint, adhesive, or fastener, if desired. The bearing housing 30 can be formed as a monolithic piece of material with the base 28, or it could be formed from a separate piece of material and fixed to the base 28, if desired. In the non-limiting embodiment illustrated, the motor housing 16 is formed from metal, such as from steel, with wall 18, base 28 and bearing housing 30 being formed as a single, monolithic piece of material, such as in a progressive drawing process, by way of example and without limitation. It is to be recognized that the motor housing 16 could be formed from a rigid plastic material, if desired, such as in a molding process.

As shown in FIG. 3, a plurality of electrical connector terminals 52 are shown extending through the base 28 for powered connection to stator 40. It is to be understood that terminals 52 are sealed to prevent the passage of solid and fluid contamination through the terminal opening(s) in the base 28 to avoid solid and fluid contamination from entering the cavity 26. It is to be further understood that the electrical connector terminals 52 could be provided to extend through another region of the motor housing 16, if desired.

Figure 6:
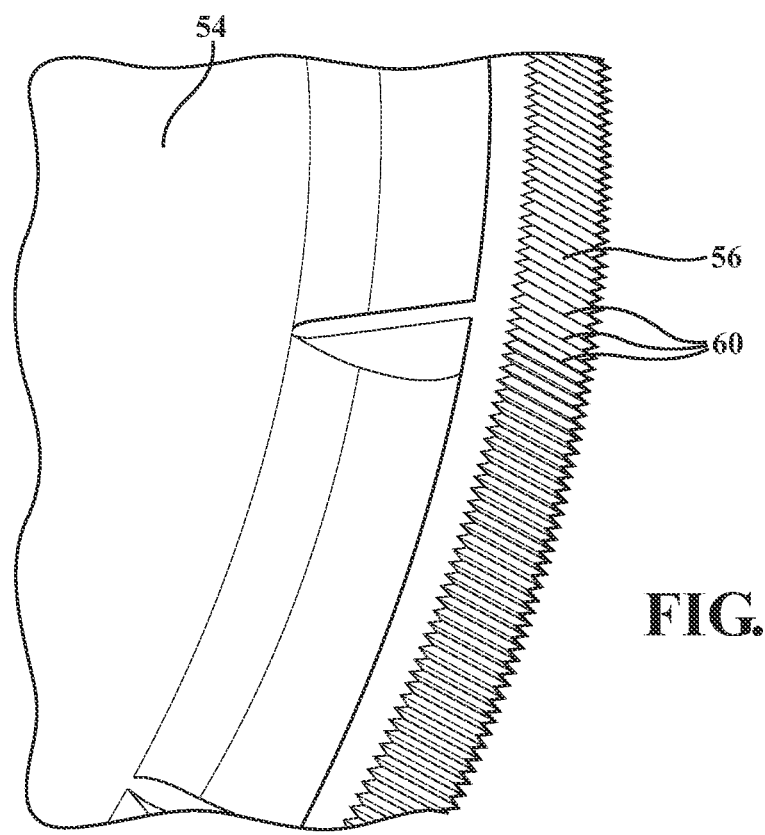
FIG. 6 is an enlarged fragmentary perspective view of the end cover showing fixation protrusions disposed about an outer periphery thereof.

The end cover assembly 46 includes an end cover 54 having an end cover outer periphery 56 fixed to the annular wall 18 of the motor housing 16 adjacent the housing second end 22. To facilitate ease of assembly, the end cover outer periphery 56 is press fit into an interference fit with the annular wall 18, and in a non-limiting embodiment, is press-fit against an inner surface 58 (best shown in FIG. 5A) of the annular wall 18. To enhance the ease and integrity of the press-it, the end cover outer periphery 56 can be formed having a plurality of protrusions 60 (FIG. 6) extending radially outwardly into an interference fit with the inner surface 58 of the wall 18. The protrusions 60, by way of example and without limitation, are shown as axially extending ribs, also referred to as splines, wherein the ribs 60 can be sized as desired to extend generally parallel to the central axis 24. To facilitate locating the end cover 54 in the precise and desired location along the central axis 24, the housing second end 22 can be formed having a counterbore formed by a recessed annular shoulder 62 (FIG. 5A). The annular shoulder 62 is shown as extending radially outwardly from the cylindrical portion of the inner surface 58 bounding the cavity 26 in generally transverse relation from the central axis 24 to form a planar stop surface. As such, while press-fitting the end cover assembly 46 into the motor housing 16, the end cover 54 is pressed into engagement with the annular shoulder 62, which serves as a positive stop surface to precisely locate the end cover 54 in the desired axial location relative to the annular wall 18. The end cover 54 has an end cover opening 63 (FIGS. 4A and 5B) extending about the central axis 24 for receipt of the motor shaft 32 in clearance relation therethrough.

The end cover assembly 46 includes a shaft seal annulus 64 fixed to the end cover 54. The shaft seal annulus 64 forms the motor shaft opening 48, such that the motor shaft opening 48 is concentric to the end cover opening 63, wherein the motor shaft opening 48 is sized providing an interference fit, also known as a tight fit, with an outer running surface 66 of the motor shaft 32. The end cover opening 63 has a first diameter D1 (FIG. 4A) and the motor shaft opening 48 has a second diameter D2 (FIG. 4B), wherein the first diameter D1 is greater than the second diameter D2. As such, as the motor shaft opening 48 guides the motor shaft 32 for rotation about the central axis 24, a slight annular radial gap, referred to as shaft clearance gap 67 (FIG. 5B), defined by (D1−D2)/2, can be present between the outer running surface 66 of the motor shaft 32 and the periphery of the end cover opening 63, thereby negating any friction between the outer running surface 66 of the motor shaft 32 and the inner surface bounding the end cover opening 63 during operation. In addition, to prevent the possibility of an outer surface 68 of the rotor 38 contacting an inner surface 70 of the stator 40 (FIG. 3), the annular shaft clearance gap 67 extending radially from the outer running surface 66 of the motor shaft 32 over a maximum second radial distance (as defined above: max D1−min D2)/2) to the inner surface of the end cover opening 63 is less than a minimum first radial distance r1 [defined by: (max diameter of outer surface 68–min diameter of inner surface 70)/2] of the motor gap 42 extending between the outer surface 68 of the rotor 38 and the inner surface 70 of the stator 40. Accordingly, with the minimum first radial distance r1 being greater than the maximum second radial distance r2, a radial gap will always remain between the outer surface 68 of the rotor 38 and the inner surface 70 of the stator 40.

The end cover 54, being formed of metal or plastic, such as in a molding operation, by way of example and without limitation, has a first modulus of elasticity, and the shaft seal annulus 64, being formed of a resilient, elastomeric polymeric material, such as rubber, has a second modulus of elasticity, wherein the second modulus of elasticity is less than the first modulus of elasticity. The reduced second modulus of elasticity is provided to form a reliable seal against the outer running surface 66 of the motor shaft 32, while also be lubricious to minimize the about of dynamic friction generated between the outer running surface 66 and the shaft seal annulus 64 during operation.

Figure 7:
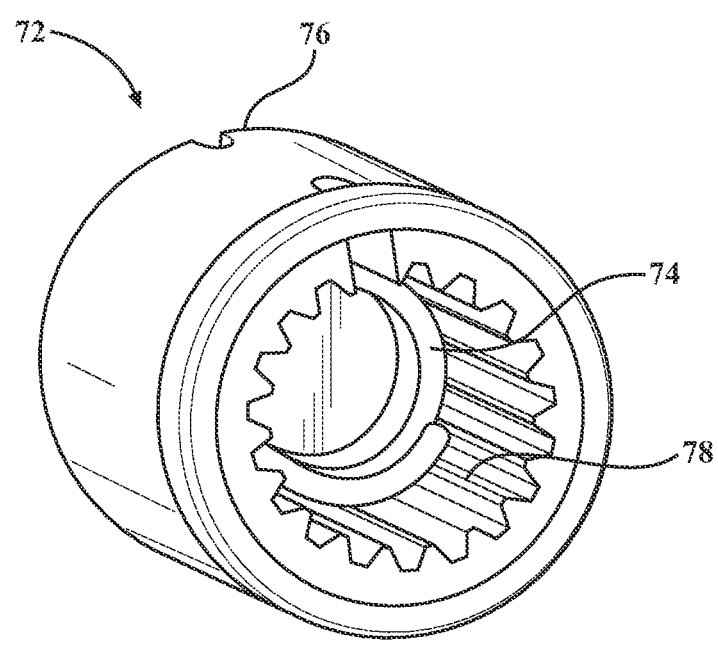
FIG. 7 is a perspective view of the output shaft coupling shown in FIG. 2.

To further relax the constraints that can otherwise result in premature wear and noise, a shaft coupling assembly 72 (FIG. 7) is provided to couple a worm shaft, also referred to as output shaft (not shown), to the motor shaft 32 for conjoint rotation therewith. The shaft coupling assembly 72 allows for axial variance while enhancing the running performance of electric motor assembly 12, including maximizing the useful life and minimizing the amount of noise generation thereof. The allowance of axial variance is provided by an axial biasing member 74 disposed in a shaft coupling housing 76 of shaft coupling assembly 72. The axial biasing member 74 can be provided via a coil spring, if desired, and is size in axial length to constantly apply an axial biasing force between the shaft second end 36 and a facing end of the output shaft (not shown). As a result of applying a constant axial load between the motor shaft 32 and the output shaft, vibration is inhibited, thus, eliminating a possible source of noise, while at the same time ensuring the motor shaft 32 and the output shaft are maintained in driving relation with one another, such that the output shaft is rotatably driven conjointly with rotation of the motor shaft 32. To ensure conjoint rotation is provided between motor shaft 32 and the output shaft, an inner surface of the shaft coupling housing 76 that bounds a receptacle in which an end of the output shaft is received can be provided with a female spline 78 (plurality of axially extending ribs or teeth) configured to mesh with a male spline formed at an end of the output shaft, thereby forming a splined connection, as will be readily understood by one possessing ordinary skill in the art upon viewing the disclosure herein.

In accordance with a further aspect of the disclosure, a method 1000 of assembling a motor vehicle electric motor assembly 12 is provided. The method 1000 includes a step 1100 of providing a motor housing 16 having an annular wall 18 bounding a cavity 26 extending about a central axis 24 from a housing first end 20 having a base 28 to an opposite housing second end 22. A further step 1200 includes fixing a bearing 44 to the base 28 for rotation about the central axis 24. Further yet, a step 1300 includes disposing a stator 40 in the cavity 26 and a step 1400 includes disposing a motor shaft 32 having a rotor 38 fixed thereto within the cavity 24, and disposing a shaft first end 34 of the motor shaft 32 through a bore of the bearing 44, with a shaft second end 36 of the motor shaft 32 extending beyond the housing second end 22 and with the stator 40 being in radially spaced relation from the rotor 38 to define an annular motor gap 42 between the stator 40 and the rotor 38. Further yet, a step 1500 includes fixing an end cover assembly 46 to the housing second end 22 and supporting the shaft second end 36 for rotation about the central axis 24 within a motor shaft opening 48 of the end cover assembly 46 with an outer periphery 50 of the motor shaft opening 48 having an interference fit with an outer running surface 66 of the motor shaft 32.

The method 1000 can further include a step 1600 of providing the end cover assembly 46 having an end cover 54, and fixing an end cover outer periphery 56 of the end cover 54 to the annular wall 18 adjacent the housing second end 22, and having a shaft seal annulus 64 fixed to the end cover 54, wherein the shaft seal annulus 64 has the motor shaft opening 48, wherein the end cover 54 has a first modulus of elasticity and the shaft seal annulus 64 has a second modulus of elasticity, wherein the second modulus of elasticity is less than the first modulus of elasticity.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:
1. A motor vehicle electric motor assembly, comprising:
a motor housing having an annular wall extending from a housing first end to an opposite housing second end about a central axis to circumferentially bound a cavity, said housing first end having a base configured to support a bearing housing and said housing second end being open;
a motor shaft extending along said central axis between a shaft first end and a shaft second end;
a rotor fixed to said motor shaft for rotation about said central axis;
a stator supported by said annular wall in radially spaced relation from said rotor to define an annular motor gap between said stator and said rotor;
a bearing fixed in said bearing housing to support said shaft first end for rotation about said central axis; and
an end cover assembly fixed to said housing second end, said end cover assembly having a motor shaft opening extending about said central axis with an outer periphery of said motor shaft opening supporting said shaft second end for rotation about said central axis,
wherein said end cover assembly includes an end cover having an end cover outer periphery fixed to said annular wall adjacent said housing second end, wherein said end cover outer periphery is press fit into an interference fit against an inner surface of said annular wall of said motor housing, wherein said housing second end has a recessed annular shoulder, said end cover being pressed into engagement with said annular shoulder.

2. The motor vehicle electric motor assembly of claim 1, wherein said bearing is a roller bearing, and wherein said shaft second end is not supported by a roller bearing.

3. The motor vehicle electric motor assembly of claim 1, wherein said end cover is plastic.

4. A motor vehicle electric motor assembly, comprising:
a motor housing having an annular wall extending from a housing first end to an opposite housing second end about a central axis to circumferentially bound a cavity, said housing first end having a base configured to support a bearing housing and said housing second end being open;
a motor shaft extending along said central axis between a shaft first end and a shaft second end;
a rotor fixed to said motor shaft for rotation about said central axis;
a stator supported by said annular wall in radially spaced relation from said rotor to define an annular motor gap between said stator and said rotor;
a bearing fixed in said bearing housing to support said shaft first end for rotation about said central axis; and
an end cover assembly fixed to said housing second end, said end cover assembly having a motor shaft opening extending about said central axis with an outer periphery of said motor shaft opening supporting said shaft second end for rotation about said central axis,
wherein said end cover assembly includes an end cover having an end cover outer periphery fixed to said annular wall adjacent said housing second end, wherein said end cover outer periphery is press fit into an interference fit against an inner surface of said annular wall of said motor housing, wherein said end cover outer periphery has a plurality of protrusions extending radially outwardly into said interference fit.

5. A motor vehicle electric motor assembly, comprising:
a motor housing having an annular wall extending from a housing first end to an opposite housing second end about a central axis to circumferentially bound a cavity, said housing first end having a base configured to support a bearing housing and said housing second end being open;
a motor shaft extending along said central axis between a shaft first end and a shaft second end;
a rotor fixed to said motor shaft for rotation about said central axis;
a stator supported by said annular wall in radially spaced relation from said rotor to define an annular motor gap between said stator and said rotor;
a bearing fixed in said bearing housing to support said shaft first end for rotation about said central axis; and
an end cover assembly fixed to said housing second end, said end cover assembly having a motor shaft opening extending about said central axis with an outer periphery of said motor shaft opening supporting said shaft second end for rotation about said central axis,
wherein said end cover assembly includes an end cover having an end cover outer periphery fixed to said annular wall adjacent said housing second end, wherein said end cover assembly includes a shaft seal annulus fixed to said end cover, said shaft seal annulus having said motor shaft opening, wherein said motor shaft opening is sized providing an interference fit with an outer running surface of said motor shaft, said end cover has a first modulus of elasticity and said shaft seal annulus has a second modulus of elasticity, said second modulus of elasticity being less than said first modulus of elasticity.

6. The motor vehicle electric motor assembly of claim 5, wherein said shaft seal annulus is rubber.

7. The motor vehicle electric motor assembly of claim 6, wherein said end cover is plastic.

8. The motor vehicle electric motor assembly of claim 5, wherein said end cover has an end cover opening arranged in concentric relation with said motor shaft opening, wherein said end cover opening has a first diameter and said motor shaft opening has a second diameter, said first diameter being greater than said second diameter.

9. The motor vehicle electric motor assembly of claim 8, wherein said annular motor gap extends radially from an outer surface of said rotor to an inner surface of said stator over a minimum first radial distance, and wherein an annular shaft clearance gap extends radially from the outer running surface of said motor shaft to an inner surface of the end cover opening over a maximum second radial distance, wherein said maximum second radial distance is less than said minimum first radial distance.

10. A motor vehicle electric motor assembly, comprising:
a motor housing having an annular wall extending from a housing first end to an opposite housing second end about a central axis to circumferentially bound a cavity, said housing first end having a base configured to support a bearing housing and said housing second end being open;
a motor shaft extending through said cavity along said central axis between a shaft first end and a shaft second end;
a rotor fixed to said motor shaft for rotation about said central axis within said cavity;
a stator supported by said annular wall in said cavity in radially spaced relation from said rotor to define an annular motor gap between said stator and said rotor;
a bearing fixed in said bearing housing to support said shaft first end for rotation about said central axis; and
an end cover assembly fixed to said housing second end, said end cover assembly having a motor shaft opening extending about said central axis with an outer periphery of said motor shaft opening supporting said shaft second end for rotation about said central axis in an interference fit without a roller bearing,
wherein said end cover assembly includes an end cover having an end cover outer periphery fixed to said annular wall adjacent said housing second end, and a shaft seal annulus fixed to said end cover, said shaft seal annulus having said motor shaft opening, wherein said end cover has a first modulus of elasticity and said shaft seal annulus has a second modulus of elasticity, said second modulus of elasticity being less than said first modulus of elasticity.

11. The motor vehicle electric motor assembly of claim 10, wherein said shaft seal annulus is rubber.

12. The motor vehicle electric motor assembly of claim 10, wherein said end cover has an end cover opening arranged in concentric relation with said motor shaft opening, wherein said end cover opening has a first diameter and said motor shaft opening has a second diameter, said first diameter being greater than said second diameter, wherein said annular motor gap extends radially over a minimum first radial distance, and wherein an annular shaft clearance gap extends radially from an outer running surface of said motor shaft to an inner surface of the end cover opening over a maximum second radial distance, wherein said maximum second radial distance is less than said minimum first radial distance.

13. The motor vehicle electric motor assembly of claim 12, wherein said end cover outer periphery is press fit into an interference fit with said annular wall of said motor housing.

14. The motor vehicle electric motor assembly of claim 13, wherein said housing second end has a recessed annular shoulder, said end cover being pressed into engagement with said annular shoulder.

15. A method of assembling a motor vehicle electric motor assembly, comprising:
- providing a motor housing having an annular wall bounding a cavity extending about a central axis from a housing first end having a base to an opposite housing second end;
- fixing a bearing to said base for rotation about said central axis;
- disposing a stator in said cavity;
- disposing a motor shaft having a rotor fixed thereto within said cavity and disposing a shaft first end of said motor shaft through a bore of said bearing, with a shaft second end of said motor shaft extending beyond said housing second end and with the stator being in radially spaced relation from said rotor to define an annular motor gap between said stator and said rotor;
- fixing an end cover assembly to said housing second end and supporting said shaft second end for rotation about said central axis within a motor shaft opening of said end cover assembly with an outer periphery of said motor shaft opening having an interference fit with an outer running surface of said motor shaft; and
- providing said end cover assembly having an end cover, and fixing an end cover outer periphery of said end cover to said annular wall adjacent said housing second end, and having a shaft seal annulus fixed to said end cover, wherein said shaft seal annulus has said motor shaft opening, wherein said end cover has a first modulus of elasticity and said shaft seal annulus has a second modulus of elasticity, said second modulus of elasticity being less than said first modulus of elasticity.

16. The method of claim 15, further including press fitting the outer periphery of said end cover into an interference fit against a plurality of protrusions extending radially outwardly from an inner surface of said annular wall of said motor housing.

17. The method of claim 15, further including press fitting the outer periphery of said end cover into an interference fit against an inner surface of said annular wall of said motor housing and bringing said outer periphery into engagement with an annular shoulder of said housing adjacent said housing second end.

* * * * *